SINGLE SIDEBAND COMMUNICATION SYSTEM
Filed March 5, 1958
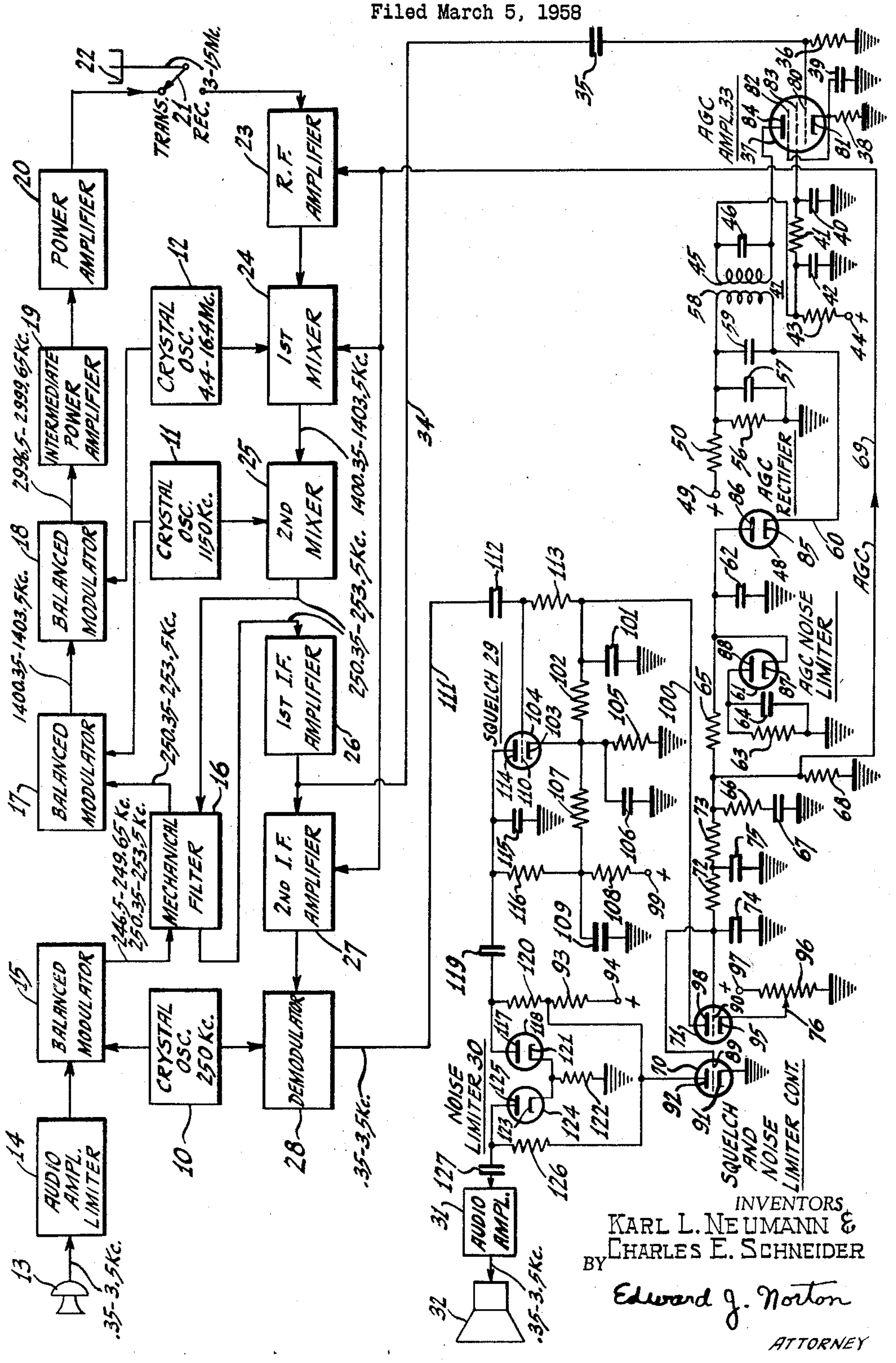
INVENTORS
KARL L. NEUMANN &
CHARLES E. SCHNEIDER
BY Edward J. Norton
ATTORNEY 2,948,808

SINGLE SIDEBAND COMMUNICATION SYSTEM

Karl L. Neumann, West Orange, and Charles E. Schneider, Elberon, N.J., assignors to Radio Corporation of America, a corporation of Delaware Filed Mar. 5, 1958, Ser. No. 719,272

12 Claims. (Cl. 250—13)

The invention relates to single sideband communication systems. Particularly, the invention is an automatic gain control circuit for use in a single sideband system and, in another aspect, a circuit arrangement by which a common mechanical filter can be used in both the transmitting and receiving paths of the system.

Conventional radio communication systems have involved in the past the transmission of a radio frequency carrier with both sidebands of a signal to be transmitted. Systems have been developed in which only one sideband of the signal is transmitted, the signal being received by adding the carrier at the receiver. The increasing congestion in the radio frequency spectrum makes the use of single sideband signals desirable in that the single sideband signal requires only one-half the spectrum space of conventional double sideband signals. The automatic gain control circuits designed for use in the double sideband systems depend for their operation on the received carrier. Since no received carrier is available in the single sideband systems, the automatic gain control circuits previously used in the double sideband systems are not readily adaptable for use in a single sideband system. The satisfactory operation of a single sideband system requires that an automatic gain control circuit be provided which is both dependable and efficient in operation.

It is, therefore, a general object of the invention to provide an improved single sideband radio communication system.

A further object is to provide a novel automatic gain control circuit by which automatic gain control, noise limiting and squelching functions can be performed in a single sideband radio communication system.

A still further object is to provide an improved automatic gain control circuit both simple in operation and in construction and readily adaptable for use in a single sideband radio communication system.

In one application of the invention, a single sideband radio communication system is provided having both a transmitting and receiving portion. Three oscillators of progressively higher frequency are used in common by the transmitter portion and the receiver portion. The transmitter portion includes three balanced modulators receptive respectively to the outputs of the three oscillators. An audio frequency signal to be transmitted is applied to the first balanced modulator, and one sideband in the output is selected by a mechanical filter for application to the second balanced modulator. The output of the second balanced modulator is tuned to pass the sum frequencies to the input of the third balanced modulator, and the output of the third balanced modulator is tuned to pass the difference frequencies through radio frequency or power amplifiers to an antenna.

In the receiver portion, the received signal is mixed with the output of the third oscillator, and the difference frequencies are mixed with the output of the second oscillator. The resulting difference frequencies are passed through the same above mentioned mechanical filter to intermediate frequency amplifiers. The amplified intermediate frequency signal is fed from the intermediate frequency amplifiers to a demodulator to which the output of the first oscillator is also applied. The resulting audio frequency signal is fed from the demodulator through squelch and noise limiter circuits and audio amplifiers to a loud speaker or other signal reproducing device.

According to the invention, a portion of the signal appearing at the intermediate frequency amplifiers is fed to a further intermediate frequency amplifier which functions to amplify the signal to a higher level. The amplified signal is fed over an electrical path including a rectifier and a capacitor-resistor circuit arrangement designed to have a given time constant. The capacitor-resistor circuit is designed to have a time constant such that the direct current AGC (automatic gain control) voltage produced varies according to the average level and not according to the voice fluctuations, and so on, of the received single sideband signal. Any fading or change in the level of an incoming single sideband signal due to atmospheric or other conditions interfering with the received signal results in a corresponding change in the level of the AGC voltage. The resulting direct current AGC voltage is fed to the intermediate frequency amplifier, mixer and radio frequency stages of the receiver portion to perform automatic gain control action. An automatic gain control circuit of a fast attack-slow release type is provided.

A feature of the invention is the use of the AGC voltage to perform noise limiting and squelching operations as well as the automatic gain control. The AGC voltage is applied through a direct current amplifier to the squelch gate circuit. A squelch control is used to set the threshold level of the squelch circuit for existing noise conditions. An AGC voltage is developed upon a signal being received which, after passing through the direct current amplifier, opens the squelch gate circuit allowing the received signal to pass to the noise limiter circuit. The AGC voltage is also used through a second direct current amplifier to control the noise limiter circuit. The noise limiter circuit is set to have the greatest limiting effect with no signal being received. An increasing level of incoming signal increases the amount of AGC voltage and, in turn, decreases by a corresponding amount the amount of limiting action. The noise limiter circuit permits the received signal to pass with a minimum of distortion but still limits all noise impulses greater than the signal amplitude to a level equal to the signal amplitude.

The particular embodiment of the invention to be described is particularly useful in mobile radio communication units employing radio frequencies in the region of about 3 to 15 megacycles.

A feature of the invention is the circuit arrangement enabling a common mechanical filter to be used in both the transmitting and receiving paths.

A more detailed description of the invention will now be given in connection with the single figure of the accompanying drawing in which a single sideband radio communication system is shown including an automatic gain control circuit arrangement constructed according to the invention.

In describing the embodiment of the invention given in the drawing, it will be assumed that the single sideband transmitting and receiving unit shown is arranged to operate in the range of 3 to 15 mc. (megacycles). However, it is to be understood that the frequencies are given only by way of example and may be altered to meet the requirements of a particular application.

The single sideband transmitting and receiving unit includes in common a first oscillator 10 having an operating frequency of 250 kc. (kilocycles), a second oscillator 11 having an operating frequency of 1150 kc. and a third oscillator 12 having an operating frequency in the range 4.4 to 16.4 mc. The oscillators 10, 11 and 12 are of the type having a high degree of frequency stability and may be crystal oscillators of known construction including means for effecting a temperature control of the crystal. The third oscillator 12 is arranged to have an operating frequency higher than the transmitted and received frequency.

The transmitter portion of the single sideband unit includes a microphone 13 or other sound pick-up device coupled to an audio amplifier and limiter 14. It will be assumed that the audio input signal is of a frequency of .35–3.5 kc. A first balanced modulator 15 receives the output of the audio amplifier 14 and the output of the oscillator 10. The signal from the audio amplifier 14 is applied in push-pull to the balanced modulator 15, and the output of the oscillator 10 is applied in parallel to the balanced modulator 15. The output of the balanced modulator 15 includes the lower sideband 246.5–249.65 kc. and the upper sideband 250.35–253.5 kc. but does not include a signal at the frequency of the oscillator 10, 250 kc. in the present example. The output of the modulator 15 is fed to a magnetostrictive mechanical filter 16 designed to pass only one of the sidebands. It will be assumed that the filter is of 250 kc. nominal frequency and that it passes only the upper sideband or 250.35–253.5 kc.

The output of the filter 16 or upper sideband is applied in push-pull to a second balanced modulator 17, the output of the oscillator 11 being applied in parallel to the second modulator 17. The sum and difference frequencies produced in the balanced modulator 17 are separated in frequency by approximately twice the frequency of the first oscillator 10. Since the sum and difference frequencies are separated by approximately 500 kc., it is possible to tune the output of the modulator 17 so that only the sum frequencies or 1400.35–1403.5 kc. are passed to the next stage or the third balanced modulator 18. The sum frequencies occupy the frequency range immediately above 1400 kc., 1400 kc. being the sum of the operating frequencies of the two oscillators 10 and 11.

The third balanced modulator 18 receives the sum frequencies from the second modulator 17 in push-pull and the output of the oscillator 12 in parallel. The sum and difference frequencies produced in the modulator 18 are widely spaced in frequency, and only the difference frequencies are passed by the tuned output circuit of the modulator 18. The frequency of the oscillator 12 is selected to be sufficiently high so that the difference frequencies resulting from the mixing action of the modulator 18 provide the desired output radio frequency of the transmitter. The difference frequencies from the modulator 18 are amplified in an intermediate power amplifier 19 and a power amplifier 20. The amplified signals are then forwarded through a transmit-receive switch 21 to an antenna 22.

If it is desired to transmit a radio frequency of 3000 kc. or 3 mc., the frequency of the third oscillator 12 is selected to have a value of 4400 kc. The difference frequencies 2996.5–2999.65 kc. are applied from modulator 18 to amplifier 19. If it is desired to transmit a radio frequency of 15,000 kc. or 15 mc., the frequency of the oscillator 12 is selected to have a value of 16,400 kc. The frequency of the oscillator 12 is similarly selected to provide other output frequencies between 3 and 15 mc. The frequency of the oscillator 12 is selected to have a value equal to the desired transmitter output frequency plus the sum of the frequencies of the first and second oscillators 10 and 11, respectively. The output frequency can be quickly changed over a considerable range by substituting one piezoelectric crystal for another in the oscillator 12 in a known manner. From the above description, it can be seen that only one frequency exists in the transmitter portion following the filter 16 to be transmitted from the antenna 22 and that, therefore, a single sideband transmitter is provided. Since various circuit arrangements suitable for use in the described stages of the transmitter portion are known, the stages have been shown for simplicity of description and drawing in block form. A further detailed description thereof is believed to be unnecessary.

The receiver portion of the transmitting-receiving unit includes a radio frequency amplifier 23 to which an incoming single sideband signal is applied from the antenna 22 through the switch 21. The output of the amplifier 23 is applied to a first mixer 24 to which the output of the oscillator 12 is also applied. A tuned circuit in the output of the mixer 24 is set so that the difference frequencies 1400.35–1403.5 kc. are fed to the second mixer 25 to which the output of the oscillator 11 is also applied. The difference frequencies 250.35–253.5 kc. in the output of the mixer 25 are applied to the mechanical filter 16. The mechanical filter 16 eliminates adjacent frequency interference and noise and passes the difference frequencies 250.35–253.5 kc. on to an intermediate frequency amplifier 26. The output of the amplifier 26 is fed through a second intermediate frequency amplifier 27 to a demodulator 28 to which the output of the oscillator 10 is also applied. The output of the demodulator 28 of a frequency 0.35–3.5 kc. is applied through a squelch circuit 29, a noise limiting circuit 30 and an audio amplifier 31 to a speaker 32 or other sound reproducing device. The squelch circuit 29 and noise limiting circuit 30 have been shown and will be described in detail. A single sideband receiver is thus provided, the oscillator 10 functioning to supply the carrier frequency signal by which the audio frequency signal is derived from the incoming single sideband signal. Since circuits suitable for use in the amplifiers 23, 26, 27 and 31, the mixers 24, 25 and the demodulator 28 of the receiver portion are known, the stages have been shown for simplicity of description and drawing in block form.

A feature of the transmitting and receiving unit shown is the use by the transmitting and receiving portions in common of the oscillators 10, 11 and 12 and the mechanical filter 16. This arrangement permits a compact construction and reduces the number of components which would otherwise be required. The frequency of the oscillator 12 is set according to the desired frequency of operation. The other frequencies in the transmitting and receiving portions are unaffected by a change in the frequency of the oscillator 12 since the difference between the transmitted and received signals relative to the frequency of the oscillator 12 remains the same or 1400 kc. To change the frequency of operation, it is only necessary to change the frequency of the oscillator 12.

It has been found that by using an oscillator 12 having a frequency higher than the frequency which is to be transmitted and received, there is a considerable reduction in the interference encountered between the various circuits in the transmitter-receiver unit. The unit can be constructed more economically since the amount of attention to the shielding required and the need for the use of highly frequency sensitive circuits is reduced. As described, the transmitting frequency is the same as the receiving frequency and is determined by the frequency of the oscillator 12. By this arrangement, communication is facilitated between two distant similar transmitting-receiving units. If the receiver portion of a local unit is tuned to receive a signal from a distant unit, the transmitter portion of the local unit is automatically tuned to the same frequency and vice versa, greatly simplifying the operational procedures.

According to the present invention, a portion of the signal appearing at the output of the intermediate frequency amplifier 26 is applied to the control grid 80 of a further intermediate frequency amplifier 33 over an electrical path including lead 34, coupling capacitor 35 and a resistor 36 connected to ground. The term ground, as used in the specification, is to be understood as referring to a point of reference potential and not necessarily earth ground. The amplifier 33 includes a vacuum tube 37 of the pentode type. The cathode 81 of tube 37 is connected to ground through a resistor 38 across which an R.F. (radio frequency) by-pass capacitor 39 is connected. The suppressor grid 82 of the tube 37 is connected to the cathode 81 thereof. The screen grid 83 of the tube 37 is maintained at R.F. ground over an electrical path including the network comprising capacitor 40 connected to ground, resistor 41 and capacitor 42 connected to ground, a resistor 43 and the positive terminal 44 of a source of unidirectional potential. The plate 84 of tube 37 is connected to the positive terminal 44 over an electrical path including the primary winding 45 of an intermediate frequency transformer 47, a capacitor 46 connected across the winding 45 and resistor 43. The tube 37 is normally conducting in the manner of an intermediate frequency amplifier, the bias supplied to the screen grid 83 preventing excessive swings in the operation of the tube 37 in response to large fluctuations in an incoming single sideband signal.

The output of the amplifier 33 is applied to the cathode 85 of a rectifier 48 over an electrical path including the positive terminal 49 of a source of unidirectional potential, resistor 50, resistor 56 and capacitor 57 connected in parallel to ground, the secondary winding 58 of the transformer 47, capacitor 59 connected across the winding 58 and lead 60. The values of the resistor 56 and capacitor 57 are determined so that the network has a time constant sufficient to cause a positive bias to be applied to the cathode 85 of the rectifier 48 to hold the rectifier 48 non-conducting in the absence of a signal of given level across the winding 58. The plate 86 of the rectifier 48 is connected to the cathode 87 of a second rectifier 61 over an electrical path including a capacitor 62 connected to ground. The plate 88 of the rectifier 61 is connected to ground through a resistor 63 across which a capacitor 64 is connected. The value of the resistor 63 and the charge time of the capacitor 64 are set so that the plate 88 of the rectifier 61 is held at a given potential with respect to ground. The bias so supplied to the plate 88 of the rectifier 61 is determined so that the rectifier 61 is normally non-conducting and conducts only when a voltage signal passed through the rectifier 48 and applied to the cathode 87 of the rectifier 61 exceeds a predetermined level. In other words, the rectifier 61 functions to eliminate any excessive changes in the level of the voltage signal due to noise and so on and, therefore, operates as a noise limiter. While the rectifiers 48, 61 are shown as vacuum tube devices, it is to be understood that the rectifiers 48, 61 may be any suitable unidirectional current conducting device.

A connection is completed from the junction of the plate 86 of rectifier 48 and the cathode 87 of rectifier 61 to ground including a resistor 65, resistor 66 and capacitor 67. A first connection is completed from the junction of the resistors 65 and 66 to the intermediate frequency amplifier 27, mixer 24 and radio frequency amplifier 23 including a resistor 68 connected to ground and lead 69. A second connection is completed from the junction of resistors 65 and 66 to the control grids 89, 90 of a pair of direct current amplifier tubes 70, 71 including an isolation filter network comprising resistors 72, 73 and capacitors 74, 75 connected to ground. The first direct current amplifier 70 includes, in addition to the grid 89, a cathode 91 connected to ground and a plate 92 connected through a resistor 93 to the positive terminal 94 of a source of unidirectional potential. The amplifier tube 70 is normally conducting. In addition to the grid 90, the second direct current amplifier tube 71 includes a cathode 95 connected to a movable contact 76 on a resistor 96. One end of the resistor 96 is connected to the positive terminal 97 of a source of unidirectional potential and the other end thereof is connected to ground. The plate 98 of tube 71 is connected to the positive terminal 99 of a source of unidirectional potential over an electrical path including lead 100, capacitor 101 connected to ground, resistor 102, the cathode 103 of the vacuum tube 104 included in the squelch circuit 29, the cathode biasing circuit including resistor 105 and capacitor 106 connected in parallel to ground, resistor 107, resistor 108 and capacitor 109 connected across resistor 108 to ground. As in the case of the first direct current amplifier tube 70, the direct current amplifier tube 71 is normally conducting.

Referring to the receiver portion of the single sideband transmitting-receiving unit shown in the drawing, the demodulator 28 includes an output tuned circuit set to pass only the audio frequency signal produced by the demodulator 28 in response to the incoming single sideband signal and the carrier frequency signal supplied by the oscillator 10. The audio frequency signal is applied from the demodulator 28 to the control grid 110 of the squelch tube 104 over an electrical path including lead 111 and coupling capacitor 112. The control grid 110 of tube 104 is also connected to the plate 98 of the second direct current amplifier tube 71 over an electrical path including resistor 113 and the lead 100. The plate 114 of the squelch tube 104 is connected to the positive terminal 99 over an electrical path including capacitor 115 connected to ground, resistor 116, resistor 108 and the capacitor 109 which by-passes the resistor 108 to ground. The output of the squelch circuit 29 appearing at the plate 114 of the tube 104 is applied to the plate 117 of a rectifier 118 through a coupling capacitor 119. The plate 117 of rectifier 118 is also connected to the positive terminal 94 through resistor 120 and resistor 93, the junction of resistors 120 and 93 being connected to the plate 92 of the first direct current amplifier tube 70. The cathode 121 of rectifier 118 is connected to ground through a resistor 122. The cathode 123 of a second rectifier 124 is also connected to ground through the resistor 122, resulting in a voltage being applied to the cathode 123 which varies as a function of the voltage developed across the resistor 122 according to the conduction of the rectifier 118. The plate 125 of rectifier 124 is connected through a resistor 126 to the junction of resistors 120 and 93, the output of the rectifier 124 being fed from the plate 125 through a coupling capacitor 127 and the audio amplifier 31 to the speaker 32. While the rectifiers 118 and 124 are shown as vacuum tube devices, any suitable unidirectional current conducting device may be used.

The amplifier 33, the rectifiers 48 and 61, the direct current amplifiers 70 and 71, the squelch circuit 29 and the rectifiers 118 and 124 included in the noise limiter 30 constitute an automatic gain control circuit arrangement according to the invention which is simple in operation and construction and is particularly suitable for use in a single sideband radio communication system. In describing the operation of the automatic gain control circuit arrangement, it will first be assumed that the receiver portion is set to monitor a given frequency channel but that no single sideband signal is being received. Any noise or other interference either received via the antenna 22 or produced internally as a result of the operation of the tubes and/or other circuit components in the receiver portion appearing at the output of the amplifier 26 is fed from the amplifier 26 to the control grid 80 of the amplifier 33 via lead 34, capacitor 35 and resistor 36. The tube 37 is biased in a normally conducting condition at a point on the linear characteristic operating curve thereof. As the level of the signal voltage applied to the control grid 80 via resistor 36 changes according to the level of the noise signals, the plate 84 goes alternately positive and negative with respect to the voltage supplied to the plate 84 via the terminal 44. An alternating current signal appears across the secondary winding 58 of the transformer 47.

The network including resistor 56 and capacitor 57 functions to supply a positive bias to the cathode 85 of the rectifier 48 such that the rectifier 48 remains non-responsive to a small alternating current signal appearing across secondary 58 as a result of the application of tube or other internally produced noise signals to the control grid 80 of the tube 37. When larger noise signals are applied to the control grid 80, the alternating current signal appearing across the secondary winding 58 becomes of sufficient level to overcome the bias supplied to the cathode 85 of the rectifier 48 and the rectifier 48 conducts during the negative going swings of the alternating current signal. The capacitor 67 charges through the resistors 66 and 65 according to the level of the negative direct current signal appearing at the plate 86 of the rectifier 48. The rectifier 61, normally held non-conducting by the network including resistor 63 and capacitor 64, conducts in response to any excessive, short noise impulses passed by the rectifier 48 and applied to the cathode 87. The rectifier 61 acts as a noise limiter by clipping or removing the peaks of any impulses exceeding the level determined by the values of the resistor 63 and capacitor 64. The level of operation of the rectifier 61 is set to prevent the production of undesired automatic gain control voltages which might otherwise be produced due to the received short noise impulses. A negative, direct current AGC (automatic gain control) voltage is developed across the resistor 68 according to the level of the charge on the capacitor 67. The AGC voltage, which is relatively small compared to the AGC voltage produced upon a single sideband signal being received, is fed via lead 69 to the intermediate frequency amplifier 27, mixer 24 and radio frequency amplifier 23, controlling the gain of the noise signals fed through the receiver portion according to the level of the noise signals applied to the amplifier 33.

The negative, direct current AGC voltage is also fed through the isolation filter network including resistors 72, 73 and capacitors 74, 75 to the control grids 89, 90 of the direct current amplifiers 70 and 71, respectively. As mentioned above, the tubes 70, 71 are set to be normally conducting. It will first be assumed that the movable contact 76 is positioned at the lower end of resistor 96 such that there is zero or minimum resistance in the cathode circuit of tube 71. Tube 71 conducts at its maximum level and a negative going voltage with respect to the positive potential supplied via the terminal 99 is applied from the plate 98 to the junction of resistors 102, 113. The control grid 110 of the squelch tube 104 is biased negative with respect to the cathode 103, causing the tube 104 to be held non-conducting. The tube 104 acts as a closed gate, preventing the passage therethrough to the output of the receiver portion of any noise or other signal received from the demodulator 28 via lead 111.

If the movable contact 76 is placed at the top of the resistor 96 such that there is maximum resistance in the cathode circuit of tube 71, tube 71 is cut off. The voltage applied to the junction of resistors 102, 113 from the plate 98 is positive going with respect to the potential supplied via terminal 99, and the control grid 110 is biased less negative with respect to the cathode 103. The tube 104 conducts, and acts as an open gate to pass any and all signals applied thereto from the demodulator 28 to the output of the receiver portion. By moving the contact 76 between the limits of the resistor 96 in the direction of increasing resistance, a point will be reached at which the resistance in the cathode circuit of tube 71 is such that the conducting state of the tube 71 causes the squelch tube 104 to change from a non-conducting or closed gate to a conducting or open gate. This point is determined according to the level of the negative AGC voltage applied to the control grid 90, since the level of the AGC voltage will determine the conduction of the tube 71 at each setting of the movable contact 76. In operation, the movable contact 76 is set immediately below the point on the resistance 96 at which the squelch tube 104 becomes conducting. That is, the movable contact 76 is set immediately below the point at which no noise can be heard from the speaker 32 or in other words, immediately below the point of noise cut-off.

As in the case of the direct current amplifier 71, the direct current amplifier 70 is normally conducting. The conduction of tube 70 results in a voltage appearing at the junction of resistors 126, 120 and 93 which is negative with respect to the positive potential supplied via terminal 94. The plates 117 and 125 of rectifiers 118 and 124, respectively, are biased only slightly positive with respect to ground as a result of the large voltage drop across resistor 93. The negative swing of a signal voltage in excess of the positive bias on plate 117 of rectifier 118 will drive rectifier 118 into non-conduction, effectively limiting the negative half cycles of the signal. The positive swing of the signal voltage appearing on plate 117 also appears at cathode 123 of rectifier 124. A positive voltage swing in excess of the positive bias will drive rectifier 124 into non-conduction, effectively limiting the positive half cycles of the signal. Only a very low level signal can pass through the limiter 30 under the above conditions. If the level of the negative AGC voltage applied to the control grid 89 increases due to an increase in the level of the noise signals, and so on, the tube 70 conducts correspondingly less heavily. The plates 117 and 125 become correspondingly more positive, permitting the rectifiers 118 and 124 to conduct in response to a signal applied thereto from the squelch circuit 29. However, as has been described, the squelch tube 104 is normally held non-conducting or closed in the absence of a received single sideband signal. No signal, therefore, is passed to or through the rectifiers 118 and 124 of the noise limiter 30.

Upon a single sideband signal of the proper frequency being received and fed to the receiver portion of the transmitting-receiving unit via the antenna 22, a portion of the received single sideband signal is fed from the output of the intermediate frequency amplifier 26 to the amplifier 33. The received signal is amplified to a higher level, and an amplified alternating current signal varying according to the changes in the level of the received single sideband signal appears at the secondary winding 58 of the transformer 47. The rectifier 48 conducts according to the level of the alternating current signal, and a negative, direct current voltage signal is applied from the plate 86 to the capacitor 67. Any sharp or sudden changes in the direct current voltage signal so produced due to ignition or other short noise pulses passed by the rectifier 48 are reduced or eliminated by the rectifier 61. The rectifier 61 effectively holds the direct current voltage below the desired maximum level by clipping the peaks of any large excursions of the voltage.

The capacitor 67 charges to a level determined according to the level of the direct current voltage applied thereto. A fast attack-slow release automatic gain control circuit is provided. The capacitor 67 charges over the low resistance path including the rectifier 48 and discharges over the high resistance path including the resistor 68. The values of the resistors 66, 68 and capacitor 67 are chosen so that the network has a relatively long time constant. That is, the time constant of the network is determined so that the AGC voltage developed across the resistor 68 does not follow voice fluctuations in the voltage applied to the capacitor 67 but is short enough to permit the AGC voltage to vary according to changes in the voltage applied to the capacitor 67 due to fading or similar conditions of the received single sideband signal. The discharge time of the capacitor 67 is such that the AGC voltage follows the average level of the voltage applied to the capacitor 67 from the rectifier 48 and, therefore, the average level of the received single sideband signal. The combination of the high level signal produced by the amplifier 33 and the long time constant of the network including resistors 66, 68 and capacitor 67 results in the production of an AGC voltage across the resistor 68 which follows the changes in the average level of the received single sideband signal due to fading, and so on, rather than the received signal itself. Instead of a carrier as used in a double sideband system and not present in the single sideband system, the AGC voltage produced by the arrangement of the invention follows the average level of the received single sideband signal. The AGC voltage is applied from the junction of resistors 66 and 68 to the intermediate frequency amplifier 27, a mixer 24 and radio frequency amplifier 23 via lead 69. Any change in the average level of the received single sideband signal is compensated by the operation of the respective stages 23, 24 and 27 in response to a corresponding change in the level of the negative AGC voltage applied thereto via lead 69. If the average level of received signal should decrease, the AGC voltage decreases a corresponding amount. An increase in the average level results in a corresponding increase in the AGC voltage, and so on.

A feature of the invention is the fact that, in addition to the AGC function, the AGC voltage is used to control the operation of the squelch and noise limiter circuits. The AGC voltage developed across the resistor 68 upon a single sideband signal being received is applied via the isolation network including resistors 72, 73 and capacitors 74, 75 to the control grids 89 and 90 of the direct current amplifiers 70 and 71, respectively. It has previously been described how the squelch circuit 29 is normally set below noise cut-off by means of the resistor 96 in the cathode circuit of the tube 71. The squelch circuit 29 is set so that an increase in the level of the negative AGC voltage applied to the control grid 90 of the amplifier 71 upon the reception of any single sideband signal of the proper frequency results in the opening of the squelch circuit 29. The increase in the level of the negative voltage applied to the control grid 90 upon a single sideband or message signal being received causes the tube 71 to conduct sufficiently less heavily that the control grid 110 becomes less negative with respect to the cathode 103 of the squelch tube 104. The tube 104 conducts and passes any and all signals applied thereto from the demodulator 28 to the noise limiter 30. From the above description, it can be seen that the squelch control or resistor 96 is used to set the threshold level for existing noise conditions. A received single sideband signal develops an AGC voltage which, after passing through the direct current amplifier 71, opens the squelch gate circuit 29, allowing the received signal to pass therethrough.

As the level of the negative AGC voltage applied to the control grid 89 of the direct current amplifier 70 increases according to the level of the received single sideband signal, the tube 70 conducts less heavily and the voltage appearing at the junction of resistors 126, 120 and 93 becomes correspondingly less negative with respect to the positive potential supplied via the terminal 94. The plates 117 and 125 of the rectifiers 118 and 124, respectively, are biased correspondingly more positive, and the rectifiers conduct in response to the signal applied thereto from the squelch circuit 29. As the rectifier 118 conducts in response to the incoming signal, a voltage is developed across the common cathode resistor 122. Since the cathode 123 is biased according to the voltage developed across the resistor 122, the rectifier 124 conducts and produces an output signal for application to the speaker 32 varying as a function of the voltage across the resistor 122 and, therefore, the signal applied to the plate 117 of the rectifier 118.

The degree to which the rectifiers 118 and 124 conduct depends on the voltage level at the junction of the resistors 126, 120 and 93 with respect to the potential supplied via the terminal 94. This voltage level is determined by the conduction of the tube 70 which is, in turn, determined according to the level of the AGC voltage. By this action, the noise limiter 30 including rectifiers 118 and 124 is only opened enough to permit the incoming signal to pass therethrough, limiting any noise or other high amplitude interference. The noise limiter 30 has the greatest limiting effect with no single sideband signal being received. An increasing level of an incoming signal increases the amount of AGC voltage which, in turn, decreases the amount of limiting action. The incoming signal is permitted to pass with a minimum of distortion but with all noise or other impulses greater than the signal amplitude limited to a level equal to the signal amplitude. A circuit arrangement is, therefore, provided according to the invention which is simple in construction and operation and by which automatic gain control, squelching and noise limiting functions can be readily performed in a single sideband system.

Under certain conditions as when a weak signal is being received or is expected, it may be desirable to lock the squelch circuit 29 in the open condition thereof. The contact 76 is operated to insert the maximum resistance in the cathode circuit of the tube 71, causing the tube 71 to be substantially cut-off. Tube 104 conducts and remains conducting to pass any and all signals applied thereto from the demodulator 28. The noise limiter 30 will operate in response to the signal passed thereto in the manner described to reduce the level of the noise and other interference which would otherwise be reproduced at the speaker 32.

An automatic gain control circuit arrangement is provided according to the invention which is readily adaptable for use in a single sideband system and, particularly, in a single sideband radio transmitting and receiving unit as shown in the drawing.

What is claimed is:

1. A single sideband receiver, comprising in combination, means to derive an intermediate frequency single sideband signal from a received radio frequency single sideband signal, means connected to the output of said first-mentioned means to derive an audio frequency signal from said intermediate frequency signal, a squelch circuit connected to the output of said second-mentioned means, a noise limiter circuit connected to the output of said squelch circuit and a sound reproducing device connected to the output of said noise limiter circuit, a control circuit connected to said first-mentioned means and responsive to said intermediate frequency signal to produce a direct current signal having a level determined according to the average level of said received signal, means to apply said direct current signal from said control circuit to said first-mentioned means, said first-mentioned means being responsive to said direct current signal to determine the gain of said intermediate frequency signal according to the level of said direct current signal, means to apply said direct current signal from said control circuit to said squelch circuit to operate said squelch circuit to pass said audio frequency signal applied to said squelch circuit from said second-mentioned means to said noise limiter circuit, means to apply said direct current signal from said control circuit to said noise limiter circuit to determine the limiting level of said noise limiter circuit according to the level of said direct current signal.

2. A single sideband receiver, comprising in combination, means to derive an intermediate frequency single sideband signal from a received radio frequency single sideband signal, means connected to the output of said first-mentioned means to derive an audio frequency signal from said intermediate frequency signal, a squelch circuit connected to the output of said second-mentioned means, a noise limiter circuit connected to the output of said squelch circuit and a sound reproducing device connected to the output of said noise limiter circuit, an amplifier connected to the output of said first-mentioned means to amplify said intermediate frequency signal to a higher level, a unidirectional current conducting device connected to the output of said amplifier and arranged to produce a direct current output signal having a level varying according to the level of said intermediate frequency signal, a capacitor-resistor circuit arrangement connected to the output of said device, said capacitor-resistor circuit having a given time constant to produce in response to said output signal a direct current control signal having a level varying according to the average level of said intermediate frequency signal, means to apply said control signal from said capacitor-resistor circuit to said first-mentioned means, said first-mentioned means being responsive to said control signal to determine the gain of said intermediate frequency signal according to the level of said control signal, means to apply said control signal from said capacitor-resistor circuit to said noise limiter circuit to determine the limiting level of said noise limiter circuit according to the level of said control signal, and means to apply said control signal from said capacitor-resistor circuit to said squelch circuit to operate said squelch circuit to pass said audio frequency signal from said second-mentioned means to said noise limiter circuit upon the reception by said first-mentioned means of said received signal.

3. A single sideband receiver comprising, in combination, means to derive an intermediate frequency single sideband signal from a received radio frequency single sideband signal, means connected to the output of said first-mentioned means to derive an audio frequency signal from said intermediate frequency signal, a squelch circuit connected to the output of said second-mentioned means, a noise limiter circuit connected to the output of said squelch circuit and a sound reproducing device connected to the output of said noise limiter circuit, a direct current amplifier connected to said squelch circuit, an intermediate frequency amplifier connected to the output of said first-mentioned means to amplify said intermediate frequency signal to a higher level, a unidirectional current conducting device connected to the output of said intermediate frequency amplifier and arranged to produce a direct current output signal having a level varying according to the level of said intermediate frequency signal, a capacitor-resistor circuit arrangement connected to the output of said device, said capacitor-resistor circuit having a given time constant to produce in response to said output signal a direct current control signal having a level varying according to the average level of said intermediate frequency signal, means to apply said control signal from said capacitor-resistor circuit to said first-mentioned means, said first-mentioned means being responsive to said control signal to determine the gain of said intermediate frequency signal according to the level of said control signal, means to apply said control signal from said capacitor-resistor circuit to said direct current amplifier, said direct current amplifier being responsive to the level of said control signal upon the reception by said first-mentioned means of said received signal to operate said squelch circuit to pass said audio frequency signal applied to said squelch circuit from said second-mentioned means to said noise limiter circuit, a second direct current amplifier connected to said noise limiter circuit, and means to apply said control signal from said capacitor-resistor circuit through said second direct current amplifier to said noise limiter circuit to determine the limiting level of said noise limiter circuit according to the level of said control signal.

4. A single sideband receiver as claimed in claim 3 and wherein a second unidirectional current conducting device is connected between the output of said first-mentioned device and a point of reference potential over an electrical path including means for biasing said second device to conduct only upon said output signal exceeding a predetermined level, whereby said output signal is maintained at a level below said predetermined level, and wherein said noise limiter circuit includes a third and fourth unidirectional current conducting device each having at least a cathode and plate electrode, means to apply voltages to said plate electrodes of a value according to said limiting level determined by the operation of said second direct current amplifier in response to said control signal, a resistor, means for connecting said cathode electrodes through said resistor to a point of reference potential, said plate electrode of said third device being coupled to the output of said squelch circuit and said plate electrode of said fourth device being coupled to said sound reproducing device.

5. A single sideband transmitting and receiving unit comprising; first, second and third oscillators of progressively higher frequencies; a transmitting portion including, a first modulator having an input coupled to the output of said first oscillator and having an input for an audio frequency signal, a mechanical filter having one end coupled to the output of said first modulator and adapted to pass only one sideband in the output of said modulator, a second modulator having one input coupled to the output of said second oscillator and having another input coupled to the other end of said filter and having an output circuit tuned to pass only the resulting sum frequencies, a third modulator having one input coupled to the output of said third oscillator and another input coupled to the output of said second modulator and having an output circuit tuned to pass only the resulting difference frequencies; and a receiving portion including, a first mixer having one input coupled to the output of said third oscillator and another input to which a received radio frequency signal is applied and having an output circuit tuned to pass only the resulting difference frequencies, a second mixer having one input coupled to the output of said second oscillator and another input coupled to the output of said first mixer, means for connecting the output of said second mixer to said other end of said filter, said filter being adapted to pass only the resulting difference frequencies constituting one sideband with relation to a hypothetical carrier having the frequency of said first oscillator, a demodulator having an input coupled to the output of said first oscillator and to the output of said filter, whereby a second audio frequency signal is produced by said demodulator, a squelch circuit connected to the output of said demodulator, a noise limiter circuit connected to the output of said squelch circuit and a sound reproducing device connected to the output of said noise limiter circuit, a control circuit connected to the output of said filter to produce a direct current signal having a level varying according to the average level of the signal appearing at the output of said filter, means to apply said direct current signal from said control circuit to said first mixer, said first mixer being responsive to said direct current signal to determine the gain of a signal of difference frequencies appearing at the output thereof, means to apply said direct current signal from said control circuit to said squelch circuit, said squelch circuit being responsive to said direct current signal upon the reception by said first mixer of said received signal to pass said second audio frequency signal applied to said squelch circuit from said demodulator to said noise limiter circuit, and means to apply said direct current signal from said control circuit to said noise limiter circuit to determine the noise limiting level of said noise limiter circuit according to the level of said direct current signal.

6. A single sideband transmitting and receiving unit, comprising; first, second and third oscillators of progressively higher frequencies, said third oscillator having a frequency higher than the frequency of the transmitted and received signal; a transmitting portion including, a first balanced modulator having an input coupled to the output of said first oscillator and having an input for an audio frequency signal, a mechanical filter having one end coupled to the output of said modulator, a second balanced modulator having one input coupled to the output of said second oscillator and having another input coupled to the other end of said filter and having an output circuit tuned to pass only the resulting sum frequencies, a third balanced modulator having one input coupled to the output of said third oscillator and another input coupled to the output of said second modulator and having an output circuit tuned to pass only the resulting difference frequencies, means to amplify the output of said third modulator to provide a signal for radiation to a distant point; and a receiving portion including, a radio frequency amplifier for amplifying a received signal, a first mixer having one input coupled to the output of said third oscillator and another input coupled to the output of said radio frequency amplifier and having an output circuit tuned to pass only the resulting difference frequencies, a second mixer having one input coupled to the output of said second oscillator and another input coupled to the output of said first mixer, means for connecting the output of said second mixer to said other end of said filter, said filter being adapted to pass only the frequencies constituting one sideband with relation to a hypothetical carrier having the frequency of said first oscillator, a first intermediate frequency amplifier having an input coupled to said one end of said filter, a second intermediate frequency amplifier having an input coupled to the output of said first intermediate frequency amplifier, a demodulator having an input coupled to the output of said first oscillator and to the output of said second intermediate frequency amplifier, whereby a second audio frequency signal is produced by said demodulator, a squelch circuit connected to the output of said demodulator, a noise limiter circuit connected to the output of said squelch circuit and a sound reproducing device connected to the output of said noise limiter circuit, a first direct current amplifier connected to said squelch circuit, a third intermediate frequency amplifier connected to the output of said first intermediate frequency amplifier, a unidirectional current conducting device connected to the output of said third intermediate frequency amplifier and arranged to produce a direct current output signal having a level varying according to the level of the signal appearing at the output of said third intermediate frequency amplifier, a capacitor-resistor circuit arrangement connected to the output of said device and having a time constant to produce a direct current control signal of a level varying according to the average level of said output signal, means to apply said control signal from said capacitor-resistor circuit to said second intermediate frequency amplifier, said first mixer and said radio frequency amplifier to determine the gain of a signal fed through said receiver portion according to the level of said control signal, means to apply said control signal from said capacitor-resistor circuit to said first direct current amplifier, said direct current amplifier being responsive to said control signal upon the reception by said radio frequency amplifier of said received signal to cause said squelch circuit to pass said second audio frequency signal from the output of said demodulator to said noise limiter circuit, a second direct current amplifier connected to said noise limiter circuit, and means to apply said control signal from said capacitor-resistor circuit through said second direct current amplifier to said noise limiter circuit to determine the limiting level of said noise limiter circuit according to the level of said control signal.

7. A single sideband transmitting and receiving unit as claimed in claim 6 and wherein a second unidirectional current conducting device is connected between the output of said first device and a point of reference potential over an electrical path including means for biasing said second device to conduct only upon said output signal exceeding a predetermined level, whereby said output signal is maintained at a level below said predetermined level.

8. A single sideband transmitting and receiving unit as claimed in claim 7 and wherein said noise limiter circuit includes a third and fourth unidirectional current conducting device each having a cathode and plate electrode, means to apply voltages to said plate electrodes of a value according to said limiting level determined by the operation of said second direct current amplifier in response to said control signal, a resistor, means for connecting said cathode electrodes through said resistor to a point of reference potential, said plate electrode of said third device being coupled to the output of said squelch circuit and said plate electrode of said fourth device being coupled to said sound reproducing device.

9. A single sideband transmitting and receiving unit comprising a transmitting path adapted to forward a message signal to a distant location, a receiving path adapted to process a message signal received from said distant location, a single mechanical filter connected in said transmitting path to be frequency selective to a signal fed through said filter in one direction and connected in said receiving path to be frequency selective to a signal fed through said filter in the opposite direction.

10. A single sideband transmitting and receiving unit comprising; first, second and third oscillators of progressively higher frequencies; a transmitting portion including, a first modulator having an input coupled to the output of said first oscillator and having an input for an audio frequency signal, a mechanical filter having one end coupled to the output of said first modulator and adapted to pass only one sideband in the output of said modulator, a second modulator having one input coupled to the output of said second oscillator and having another input coupled to the other end of said filter and having an output circuit tuned to pass only the resulting sum frequencies, a third modulator having one input coupled to the output of said third oscillator and another input coupled to the output of said second modulator and having an output circuit tuned to pass only the resulting difference frequencies; and a receiving portion including, a first mixer having one input coupled to the output of said third oscillator and another input to which a received radio frequency signal is applied and having an output circuit tuned to pass only the resulting difference frequencies, a second mixer having one input coupled to the output of said second oscillator and another input coupled to the output of said first mixer, means for connecting the output of said second mixer to said other end of said filter, said filter being adapted to pass only the resulting difference frequencies constituting one sideband with relation to a hypothetical carrier having the frequency of said first oscillator, a demodulator having an input coupled to the output of said first oscillator and to said one end of said filter, whereby a second audio frequency signal is produced by said demodulator, and a signal reproducing device connected to said demodulator and responsive to said second audio frequency signal.

11. A single sideband receiver comprising, in combination, means to derive an intermediate frequency signal from a received radio frequency single sideband signal, means connected to the output of said first-mentioned means to derive an audio frequency signal from said intermediate frequency signal, a noise limiter circuit coupled to the output of said second-mentioned means and including first and second unidirectional current conducting devices each having a cathode and plate electrode, an amplifier connected to the output of said first-mentioned means to amplify said intermediate frequency signal to a higher level, a third unidirectional current conducting device connected to the output of said amplifier and arranged to produce a direct current output signal having a level varying according to the level of said intermediate frequency signal, a fourth unidirectional current conducting device connected between the output of said third device and a point of reference potential over an electrical path including means for biasing said fourth device to conduct only upon said output signal exceeding a predetermined level, whereby said output signal is maintained at a level below said predetermined level, a capacitor-resistor circuit connected to the output of said third device, said capacitor-resistor circuit having a given time constant to produce in response to said output signal a direct current control signal having a level varying according to the average level of said intermediate frequency signal, means to apply said control signal from said capacitor-resistor circuit to said first-mentioned means, said first-mentioned means being responsive to said control signal to determine the gain of said intermediate frequency signal according to the level of said control signal, a direct current amplifier coupled to and responsive to the output of said capacitor-resistor circuit, means to bias the plate electrodes of said first and second devices according to a limiting level determined by the operation of said direct current amplifier in response to said control signal, a resistor, means for connecting the cathode electrodes of said first and second devices through said resistor to a point of reference potential, the plate electrode of said first device being coupled to the output of said second-mentioned means and the plate electrode of said second device being coupled to a sound reproducing device.

12. A single sideband receiver comprising, in combination, means to derive an intermediate frequency signal from a received radio frequency single sideband signal, means connected to the output of said first-mentioned means to derive an audio frequency signal from said intermediate frequency signal, a noise limiter circuit coupled to the output of said second-mentioned means and including first and second unidirectional current conducting devices each having first and second electrodes, an amplifier connected to the output of said first-mentioned means to amplify said intermediate frequency signal to a higher level, a control circuit including a third unidirectional current conducting device connected to the output of said amplifier and arranged to produce a direct current output signal having a level varying according to the level of said intermediate frequency signal, a capacitor-resistor circuit connected to the output of said third device and having a given time constant to produce a direct current control signal having a level varying according to the average level of said intermediate frequency signal, means to apply said control signal from said capacitor-resistor circuit to said first-mentioned means, said first-mentioned means being responsive to said control signal to determine the gain of said intermediate frequency signal according to the level of said control signal, a direct current amplifier coupled to and responsive to the output of said capacitor-resistor circuit, means to bias the first electrodes of said first and second devices according to a limiting level determined by the operation of said direct current amplifier in response to said control signal, a resistor, means connecting the second electrodes of said first and second devices through said resistor to a point of reference potential, the first electrode of said first device being coupled to the output of said second-mentioned means and the first electrode of said second device being coupled to a signal responsive device.

References Cited in the file of this patent

UNITED STATES PATENTS

| | | |
|---|---|---|
| 2,152,470 | Farrington | Mar. 28, 1939 |
| 2,171,636 | Seeley | Sept. 5, 1939 |
| 2,219,749 | Oswald | Oct. 29, 1940 |
| 2,611,081 | Spencer | Sept. 16, 1952 |
| 2,770,721 | Clark | Nov. 13, 1956 |
| 2,808,504 | Neumann et al. | Oct. 1, 1957 |